Patented Oct. 16, 1923.

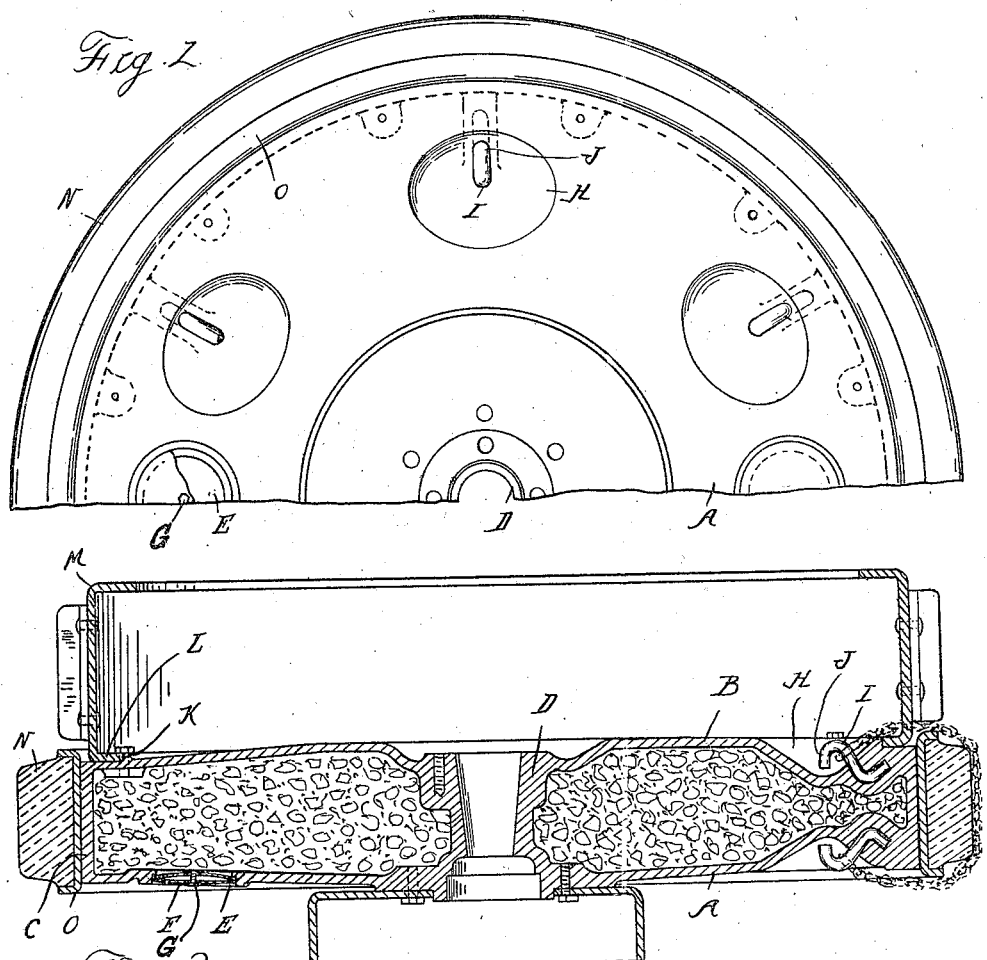

1,470,901

UNITED STATES PATENT OFFICE.

THOMAS C. WHITEHEAD, OF DETROIT, MICHIGAN.

TRACTOR WHEEL.

Application filed April 3, 1922. Serial No. 548,990.

*To all whom it may concern:*

Be it known that I, THOMAS C. WHITEHEAD, a citizen of the United States of America, residing at Detroit, in the county of Wayne and State of Michigan, have invented certain new and useful Improvements in Tractor Wheels, of which the following is a specification, reference being had therein to the accompanying drawings.

The invention relates to tractor wheels and the present application forms in part a division of the subject-matter of my application, Serial No. 446,910, filed February 21, 1921. It is the primary object of the invention to obtain a tractor wheel, the traction of which may be varied to correspond to the load which is pulled. It is a further object to adapt the wheel for various conditions of service as hereinafter set forth.

In the drawings:

Figure 1 is a side elevation showing one-half of the tractor wheel; and

Figure 2 is a cross-section thereof.

In the use of tractors for the pulling of loads, it frequently happens that the weight carried by the tractor wheel is insufficient to secure the required traction. While this difficulty might be overcome by loading the frame of the tractor, there is no convenient means of accomplishing such result. I have, however, devised a construction of hollow wheel which forms a container for any suitable material that will add weight and by putting the required amount of material in this container, any desired degree of traction may be obtained.

The body of the wheel is preferably formed of cast metal and preferably cast iron, including spaced disks A and B peripherally connected to each other by a felloe C and also centrally connected by an integral hub D. At one or more points in the sides of the disk are arranged openings E which may be closed by a pair of oppositely arranged dished disks F with a clamping bolt G for expanding the same. Any other suitable closure may, however, be used in place of the one just described.

At a number of points around the disk I form depressions or pockets H in which are arranged hooks I suitable for engaging chains. The shanks of these hooks are bent, as indicated at J, and are cast into the metal of the disk so as to be securely fastened thereto. The hooks proper, being within the pockets, will not project beyond the sides of the body of the disk. On one side of the wheel there is formed an annular shoulder K, which forms a pilot for receiving the flange L of a supplemental rim M. This supplemental wheel is cleated so as to be adapted for use in soft ground, while the disk wheel is preferably provided with a rubber tire N suitable for use upon pavements and hard roads. As shown, this tire is carried upon a rim O which is pressed on, or otherwise secured, to the periphery of the rim C.

With the construction as described the wheels may be placed on tractors designed for various uses and the weight may then be adjusted to correspond to the particular use required. This weighting I preferably produce by inserting metallic slugs, shavings or chips, which can be inserted through the apertures E when the closures F are removed. The fact that the wheel is made of cast iron and that the walls are of substantial thickness, avoids the grinding or cutting away of the wheel incident to the rolling about of the loading material placed therein.

This construction is particularly advantageous where rubber tires are used. In order to protect roads and pavements, cleated wheels are not permitted to travel over the same. On the other hand, if the wheels are formed with rubber tires, either pneumatic, solid or cushioned, the traction may be insufficient to pull the load, particularly if the pavement is wet. Thus by providing means for loading the wheels, I have overcome this difficulty for the traction is directly proportionate to the weight.

What I claim as my invention is:

1. A vehicle wheel having a cast disk body provided with one or more pockets adjacent to its periphery, and a chain hook located in each pocket and having a shank cast into the metal of the wheel.

2. A vehicle wheel having a cast disk body provided with one or more pockets adjacent its periphery, and chain engaging means located in each pocket.

In testimony whereof I affix my signature.

THOMAS C. WHITEHEAD.